United States Patent
Cronin et al.

(10) Patent No.: US 9,418,360 B1
(45) Date of Patent: Aug. 16, 2016

(54) DIGITAL KIOSK

(71) Applicant: ProSports Technologies, LLC, Miami, FL (US)

(72) Inventors: John E. Cronin, Bonita Springs, FL (US); Nick Reasner, Chicago, IL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,262

(22) Filed: Jul. 13, 2015

Related U.S. Application Data

(60) Provisional application No. 62/023,804, filed on Jul. 11, 2014.

(51) Int. Cl.
  *G06Q 30/06* (2012.01)
  *G06T 11/60* (2006.01)
  *H04N 5/225* (2006.01)
  *G06Q 20/20* (2012.01)

(52) U.S. Cl.
  CPC ............. *G06Q 20/209* (2013.01); *G06Q 30/06* (2013.01); *G06Q 30/0621* (2013.01); *G06Q 30/0643* (2013.01); *G06T 11/60* (2013.01); *H04N 5/2252* (2013.01)

(58) Field of Classification Search
  None
  See application file for complete search history.

(56) References Cited

U.S. PATENT DOCUMENTS

| | | | |
|---|---|---|---|
| 5,748,731 A | 5/1998 | Shepherd | |
| 6,680,715 B2 | 1/2004 | Blotky et al. | |
| 2004/0093266 A1 | 5/2004 | Dohring | |
| 2005/0289061 A1 | 12/2005 | Kulakowski et al. | |
| 2007/0232399 A1 | 10/2007 | Kathman et al. | |
| 2007/0233558 A1 | 10/2007 | Jones et al. | |
| 2009/0029754 A1 | 1/2009 | Slocum et al. | |
| 2009/0299891 A1 | 12/2009 | Sapir et al. | |
| 2011/0040539 A1* | 2/2011 | Szymczyk | G06Q 30/0603 703/6 |
| 2012/0016761 A1 | 1/2012 | Najm et al. | |
| 2013/0006869 A1 | 1/2013 | Grab et al. | |
| 2013/0313778 A1* | 11/2013 | Thomas | A63F 3/00031 273/244.2 |
| 2014/0178029 A1* | 6/2014 | Raheman | H04N 5/772 386/224 |
| 2014/0207557 A1 | 7/2014 | Choi et al. | |

FOREIGN PATENT DOCUMENTS

| | | |
|---|---|---|
| CA | 2 806 881 | 2/2012 |
| EP | 2 725 541 | 4/2014 |
| WO | WO 02/01494 | 1/2002 |
| WO | WO2004067286 A2 * | 8/2004 |

OTHER PUBLICATIONS http://www.theguardian.com/sport/2009/dec/14/nike-sponsorship-tiger-woods, 2009.*

(Continued)

*Primary Examiner* — Allen Chein
(74) *Attorney, Agent, or Firm* — Polsinelli LLP

(57) ABSTRACT

The present invention includes systems and methods for operating a fan kiosk. A graphical user interface at a kiosk provides a user with an option to select a player. One or more displays at the kiosk display one or more life-size representations and one or more sponsor identifiers of one or more sponsors of the selected player. The kiosk also uses information from a database to generate the displays. The kiosk can provide an image of the selected player superimposed on an image of the user. The kiosk saves user information and synchronizes saved data with the database.

8 Claims, 9 Drawing Sheets

(56) References Cited

OTHER PUBLICATIONS

"Crew announces new video boards at Crew Stadium ahead of 2014 campaign", Crew Communications, TheCrew.com, Jan. 24, 2014.
Dawes, Robert; "Augmented Reality Athletics", BBC Research & Development Blog, Jul. 31, 2012.
"Fan Experience 2008—Raising the bar to keep fans in the fold and revenue streams flowing" Fan Experience, Special Advertising Section, Jul. 21-27, 2008.
"Goal!! EON Reality and CSM Brazil Announce Partnership for Virtual Reality Interactive Soccer Game", EON Reality, May 12, 2014.
Moscaritolo, Angela; "Keep Tabs on Lebron With New Galaxy-Focused App", News & Opinion, PCMag.com, May 1, 2014.
"NCAA, Turner Sports, CBS Sports, Google Promote March Madness Through Fan Experience", Sports Video Group, Mar. 18, 2014.
PUCA Trade; Jun. 26, 2014.
U.S. Appl. No. 14/798,300 Office Action mailed Sep. 16, 2015.
U.S. Appl. No. 14/798,300, Seith M. Cronin, Display Device With Authenticated Digital Collectables, filed Jul. 13, 2015.
U.S. Appl. No. 14/798,300 Final Office Action mailed Jan. 11, 2016.
U.S. Appl. No. 14/798,300 Office Action mailed May 23, 2016.

\* cited by examiner

DIGITAL KIOSK

CROSS-REFERENCE TO RELATED APPLICATIONS

This application claims the priority benefit of U.S. provisional application No. 62/023,804, filed on Jul. 11, 2014 and titled "Digital Concessions," the disclosure of which is incorporated herein by reference.

BACKGROUND OF THE INVENTION

1. Field of the Invention

The present invention relates generally to digital kiosks. More specifically, the present invention relates to operating a digital kiosk using data from multiple sources.

2. Description of the Related Art

Marketers currently have a variety of options for engaging fans for events. Marketers can engage fans on websites by providing information such as stories about an athlete. Marketers can place life-like posters of an athlete at an event. Marketers can display sports memorabilia such as sports equipment used by an athlete.

It is difficult, however, to satisfy the interests of and engage a large number of fans. Though fans have different interests, marketers cannot display memorabilia related to all athletes at all event venues. Marketers cannot generate a variety of life-like posters for all athletes at all events. It is difficult for marketers to maintain fan engagement because of these limitations.

There is a need in the art for improved systems and methods for operating a fan kiosk.

SUMMARY OF THE PRESENTLY CLAIMED INVENTION

One exemplary method for operating a kiosk describes displaying a plurality of players and a photo option for selection on a graphical user interface. The method also describes receiving a player selection from a user through the graphical user interface. The method also describes displaying one or more representations of the selected player on one or more displays. The method also describes taking a photo of the user and requesting payment from the user when the user selects the photo option. The method also describes saving information associated with the user to a database. The method also describes providing the photo to the user.

One exemplary system for operating a kiosk provides one or more displays, a camera, and a processor. Execution of instructions stored in the memory by the processor performs a set of operations. The operations include displaying a plurality of players and a photo option for selection on a graphical user interface. The operations also include receiving a player selection from a user through the graphical user interface. The operations also include displaying one or more representations of the selected player on one or more displays. The operations also include taking a photo of the user and requesting payment from the user when the user selects the photo option. The operations also include saving information associated with the user to a database. The operations also include providing the photo to the user.

One exemplary non-transitory computer-readable storage medium is also described, the non-transitory computer-readable storage medium having embodied thereon a program executable by a processor to perform an exemplary method for operating a kiosk. The exemplary program method describes displaying a plurality of players and a photo option for selection on a graphical user interface. The program method also describes receiving a player selection from a user through the graphical user interface. The program method also describes displaying one or more representations of the selected player on one or more displays. The program method also describes taking a photo of the user and requesting payment from the user when the user selects the photo option. The program method also describes saving information associated with the user. The program method also describes providing the photo to the user.

DETAILED DESCRIPTION

The present invention includes systems and methods for operating a fan kiosk. A graphical user interface at a kiosk provides a user with an option to select a player. When a user selects a player, one or more displays at the kiosk display one or more life-like representations of the selected player and one or more identifiers of one or more sponsors of the selected player. The kiosk also uses information provided from a database to generate the one or more representations and the one or more sponsor identifiers. The kiosk can provide an image of the selected player superimposed on an image of the user when the user selects a photo option and provides a payment for the superimposed image. The kiosk saves information associated with the user and synchronizes saved data with the database.

A fan kiosk can be operated at entertainment or cultural events that are presented at a theatre, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, the opera, and the like; religious events; and more permanent exhibitions such as museum, historic home, and the like. Names used for people and organizations are also exemplary.

Figure 1:
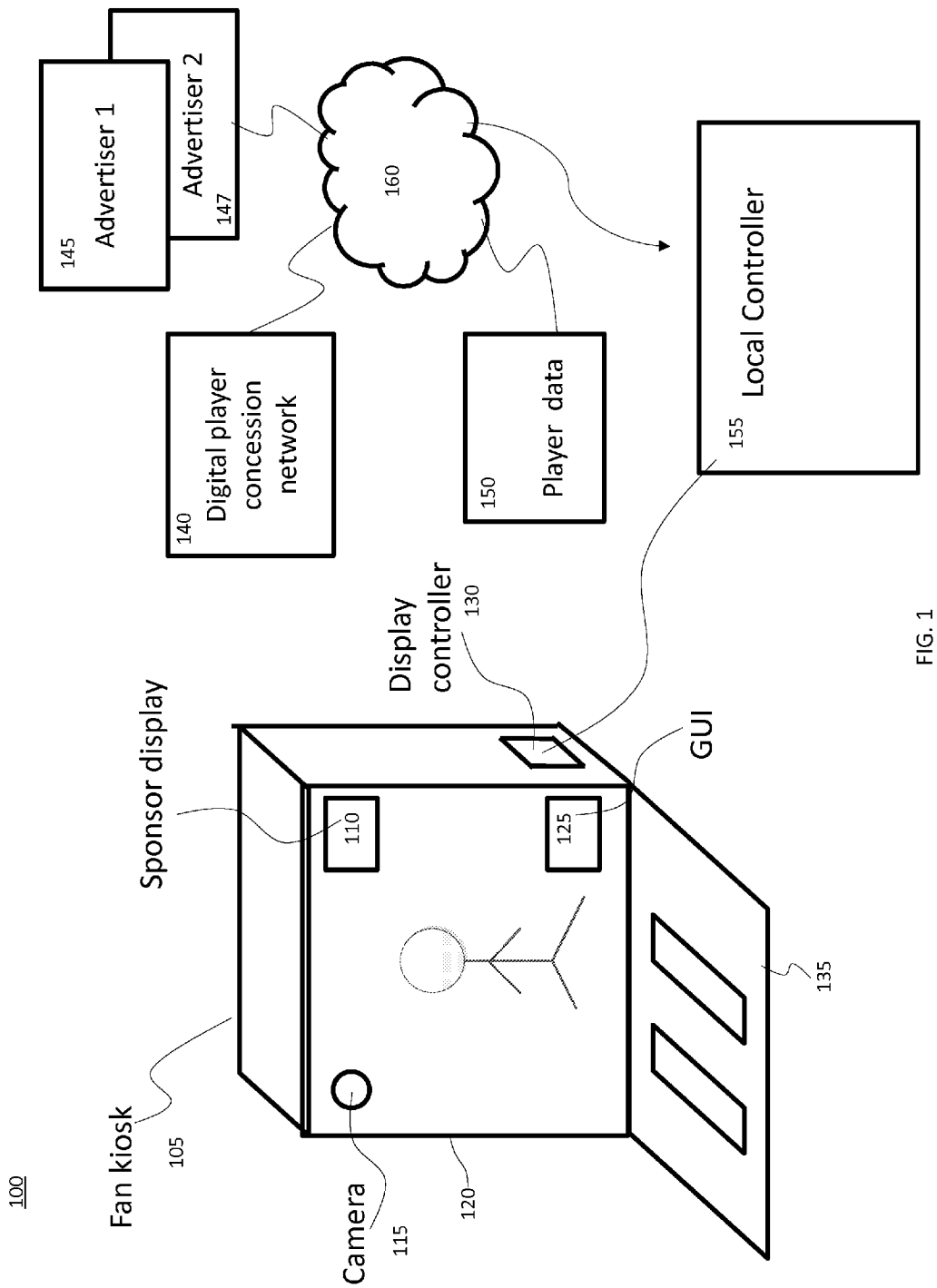
FIG. 1 illustrates a system for operating a fan kiosk.

FIG. 1 illustrates a system 100 for operating a fan kiosk. The system 100 of FIG. 1 includes a fan kiosk 105, a digital player concession network 140, two advertisers, labeled as Advertiser 1 145 and Advertiser 2 147, one or more player data sources 150, a local controller 155, and a communication network 160. In other embodiments, more advertisers, or fewer advertisers, can be included. The fan kiosk 105 includes a sponsor display 110, a camera 115, a vertical display 120, a floor display 135, a station graphical user interface (GUI) 125, a payment GUI (not shown), and a display controller 130. The digital player concession network 140 can include a digital player concession network database (not shown).

The vertical display 120 can be a life-like display of a player. The vertical display 120 can also be a screen on which a life-like depiction of a player can be displayed. The floor display 135 can be a surface on which a life-like depiction of a player can be displayed. The floor display 135 can show a player's feet. The player's feet can be displayed to represent the actual size of the player's feet. A user can use the fan kiosk 105 to compare hand size or feet size with a player. When the vertical display 120 or floor display 135 displays a player, the sponsor display 110 displays a sponsor of the displayed player.

The user can use the station GUI 125 to control the vertical display 120 and the floor display 135. The user can select through the station GUI 125 the player that is displayed by the fan kiosk. The user can provide credit card information through the payment GUI. The user can choose a photo option through the station GUI 125. By selecting the photo option, the camera 115 will take a photo. The camera 115 can take a photo of the user and superimpose the photo with an image of a player selected from the station GUI 125. The superimposed image can be provided to the user through email or printed at the fan kiosk 105. The user can provide payment for the photo through the payment GUI. The payment GUI can be provided to the user using a display used to provide the station GUI 125.

The local controller 155 is connected to the display controller 130. The local controller 155 can be connected to the display controller 130 via the communication network 160. The local controller 155 can program the fan kiosk 105 using data from the digital player concession network 140, Advertiser 1 145, Advertiser 2 147, and the one or more player data sources 150. Advertiser 1 145, Advertiser 2 147, and the one or more player data sources 150 can provide the digital player concession network 140 with player-related information. Advertiser 1 145 and Advertiser 2 147 can also sponsor one or more players through the digital concession network 140. The local controller 155 can download player-related information from the digital player concession network 140. The display controller 130 can download information from the local controller 155.

Figure 2:
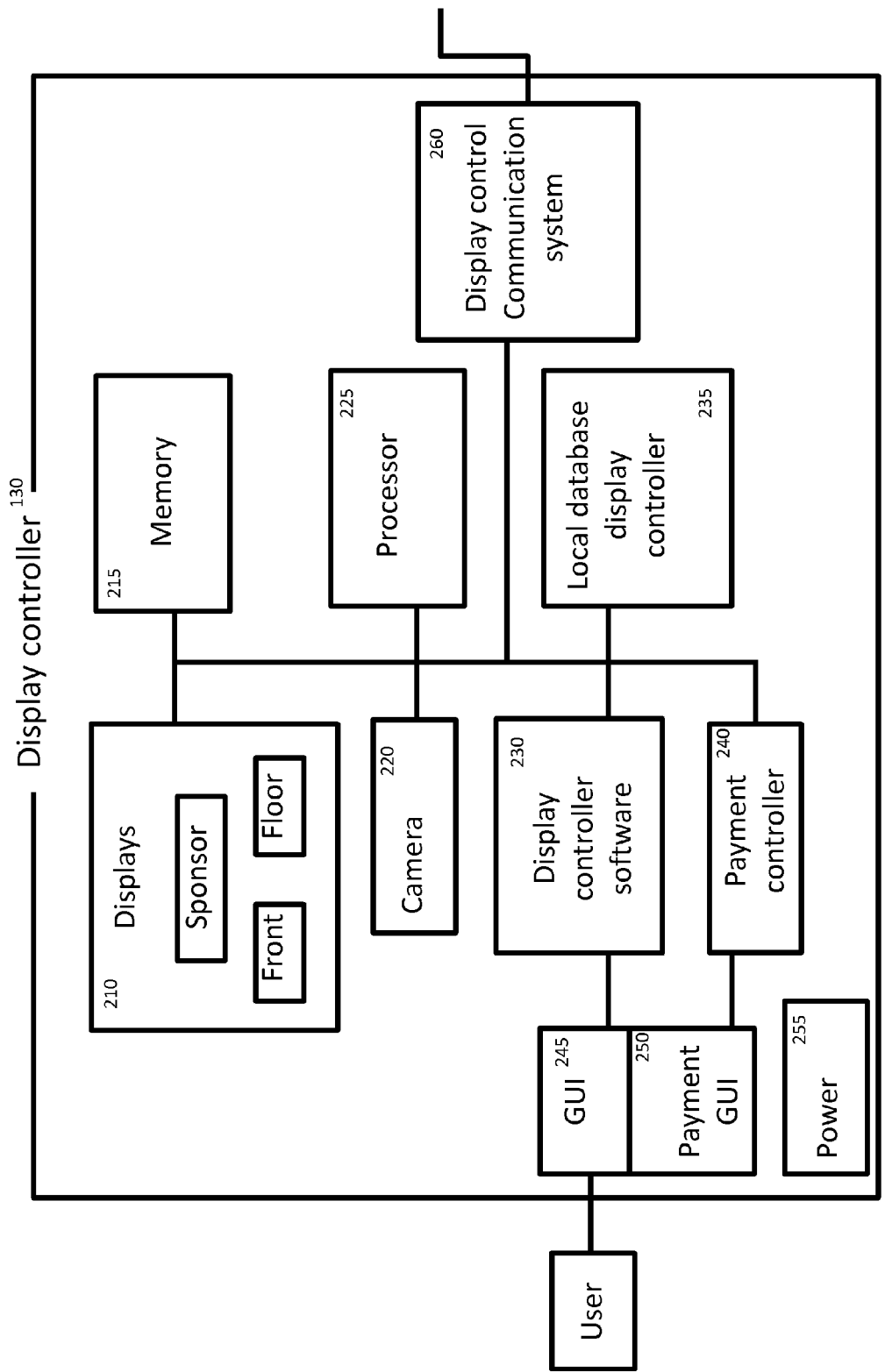
FIG. 2 illustrates a display controller.

FIG. 2 illustrates the display controller 130. The display controller 130 of FIG. 2 includes a displays unit 210, a memory 215, a camera unit 220, a processor 225, a display controller software 230, a GUI unit 245, a payment GUI unit 250, a payment controller 240, a power unit 255, a local database display controller 235, and a display control communication system 260. The displays unit 210 can control the sponsor display 110, the vertical display 120, and floor display 135. The camera unit 220 can control the camera 115. The GUI unit 245 can control the station GUI 125. The payment GUI 250 can control the payment GUI. The payment controller 240 can control the payment process. The power unit 255 can control power used by the fan kiosk 105. The local database display controller 235 can store data such as fan name, payment information, player selection information, and picture file information. The display control communication system 260 can allow the display controller 130 to connect with the local controller 155. The display controller software 230 can be implemented to run the display controller 130. The processor 225 can be used to run the display controller 130. The memory 215 can store, in part, instructions and data for execution by the processor 225.

The display controller 130 can access the local database display controller 235 for information associated with the user's player selection. The display controller 130 can use this information to provide the appropriate player and sponsor display on the vertical display 120, the floor display 135, and the sponsor display 110.

The display controller 130 can also control the camera 115 to take a picture when the user requests a picture through the GUI 125. The payment controller 240 can process the payment required from the user for the picture. The display controller 140 can transfer user data associated with the player selection, the picture request, and the payment via the display control communication system 260. The display controller 130 can transfer user data associated with the player selection, the picture request, and the payment to the local controller 155. The local controller 155 can transfer the user data through the communication network 160 to, for example, the digital player concession network 140.

Figure 3:
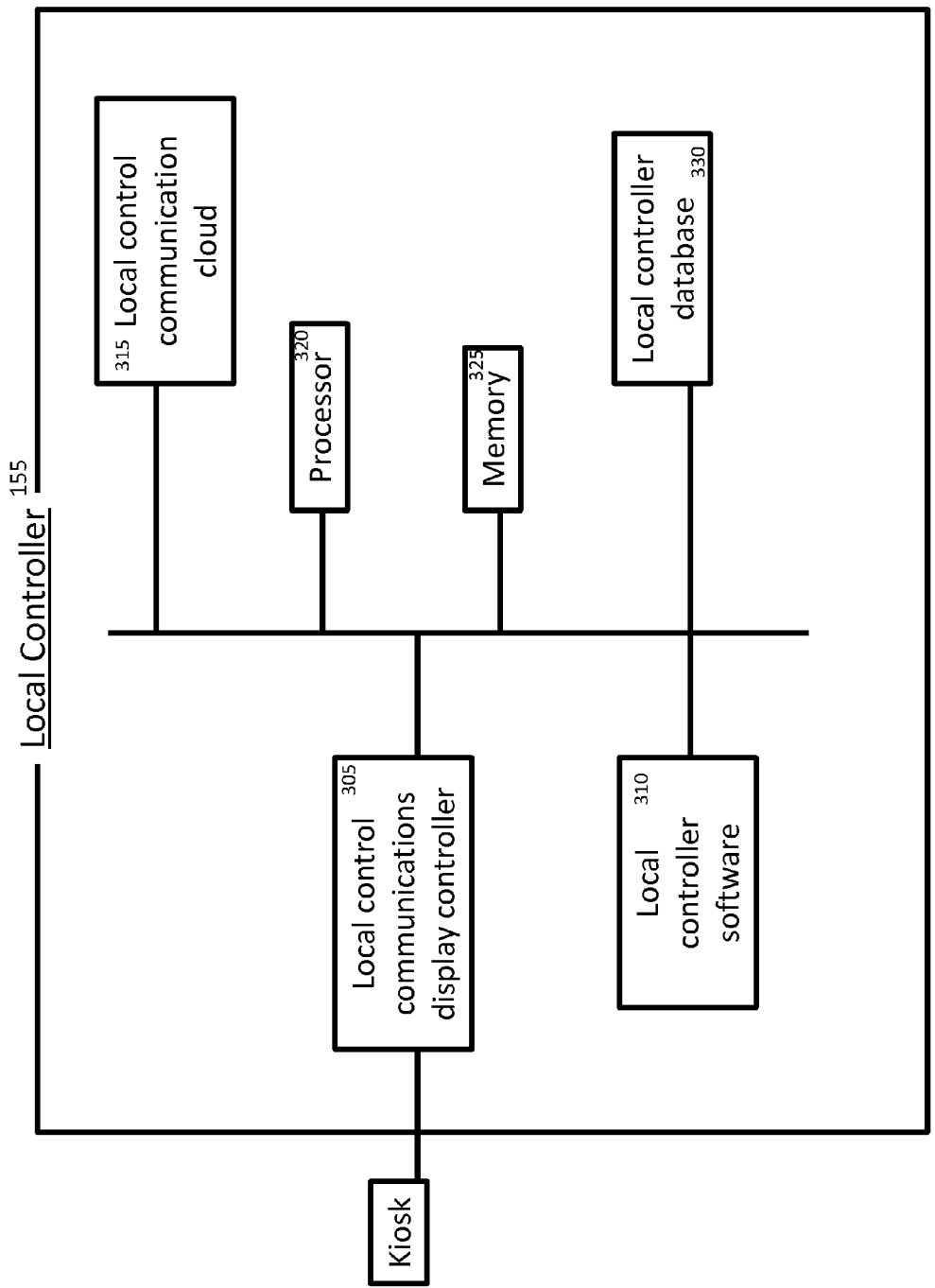
FIG. 3 illustrates a local controller.

FIG. 3 illustrates the local controller 155. The local controller 155 of FIG. 3 includes a local controller communications display controller 305, a local controller software 310, a local control communication cloud unit 315, a processor 320, a memory 325, and a local controller database 330. The local controller communications display controller 305 provides access to the kiosk. The local controller communications display controller 305 can allow the local controller 155 to access the display controller 130. The local control communication cloud unit 315 can allow the local controller 155 to access the communication network 160. The local control communication cloud unit 315 can allow the local controller 155 to access the digital player concession network 140 via the communication network 160. The local controller database 330 can store data such as fan name, payment information, player selection information, and picture file information. The local controller software 310 can be implemented to run the local controller 155. The processor 320 can be used to run the local controller 155. The memory 325 can store, in part, instructions and data for execution by the processor 320.

Figure 4:
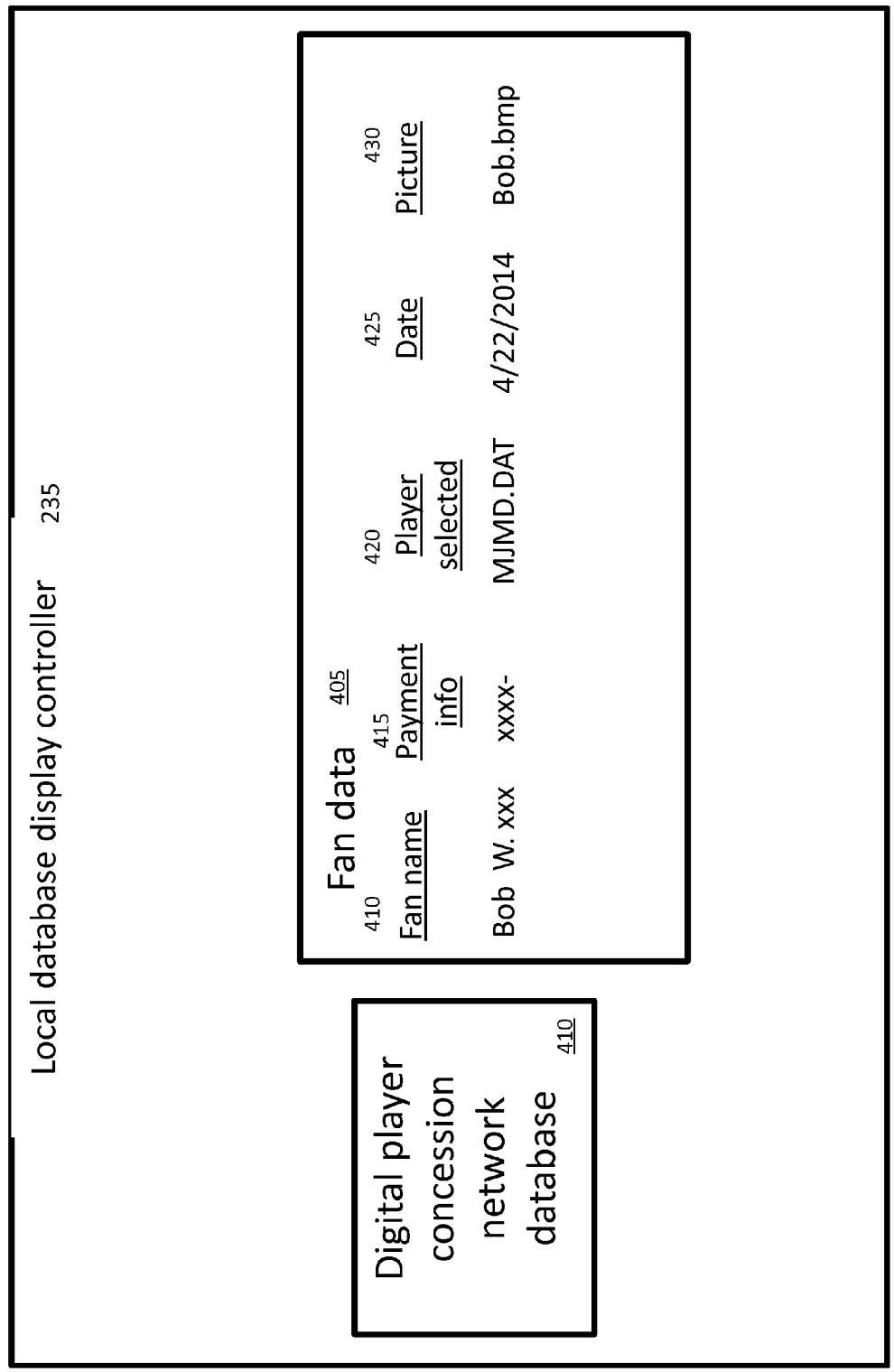
FIG. 4 illustrates a local database display controller.

FIG. 4 illustrates the local database display controller 235. The local database display controller 235 of FIG. 4 includes a database table 405. In other embodiments, more database tables, or fewer database tables, can be included. The local database display controller 235 can also include the digital player concession network database 410. The local controller database 330 and local database display controller 235 are synchronized to contain the same information. The database table 405 includes five columns. The first column is a fan name column 410, which identifies a fan for which information is provided in each corresponding row. The second column is a payment information column 415, which includes payment information for the corresponding fan. The third column is a player selected column 420, which identifies a player that was selected from the station GUI 125 by the fan for the corresponding record. The fourth column is a data column 425, which identifies a date as to when data was recorded in the corresponding column. The fifth column is a picture column 430, which identifies an image file created when a fan selects to take a photo from the station GUI 125. The first record indicates that Bob selected a player, identified in the database table 405 as "MJMD.DAT," and selected to take a photo superimposed with an image of the selected player.

Figure 5:
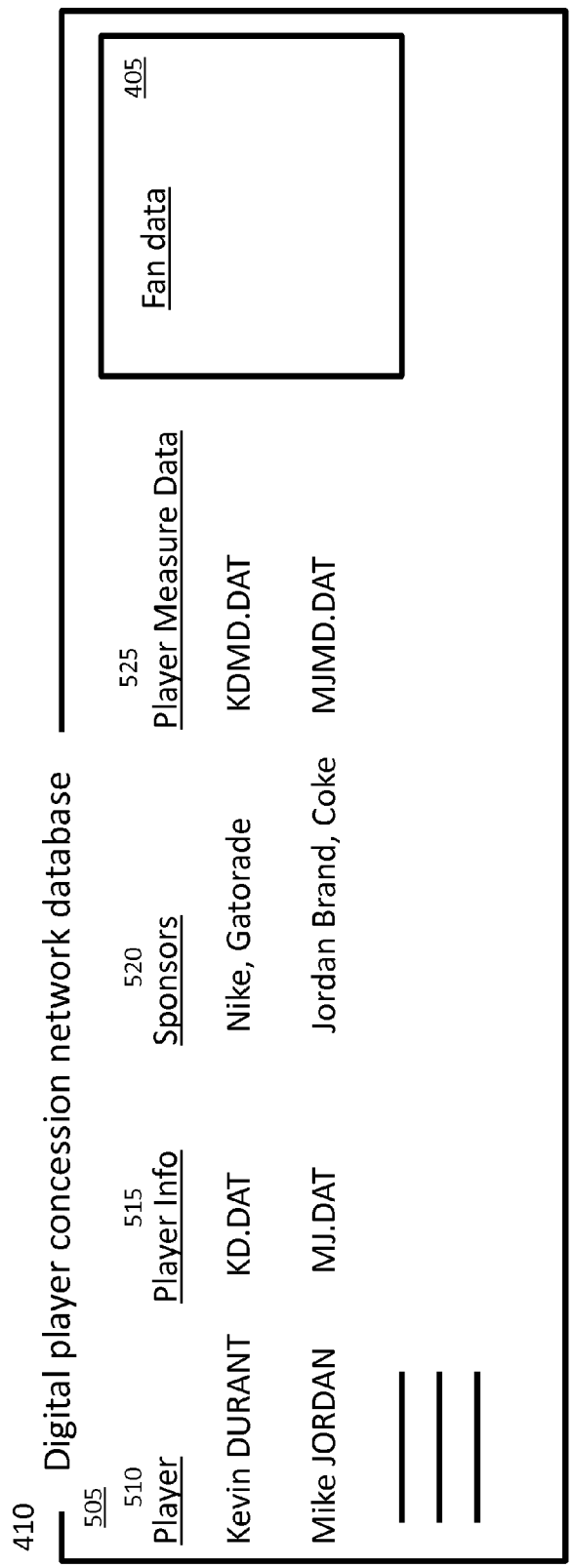
FIG. 5 illustrates a digital player concession network database.

FIG. 5 illustrates the digital player concession network database 410. The digital player concession network database 410 of FIG. 5 includes a database table 505. In other embodiments, more database tables, or fewer database tables, can be included. The digital player concession network database 410 can also include the local database display controller database table 405. The digital player concession network database table 505 includes four columns. The first column is a player name column 510, which identifies a player for which information is provided in each corresponding row. The second column is a player information column 515, which identifies a player information file associated with the corresponding player. A player information file includes player information such as statistics, weight, height, and likes and dislikes of a player. The third column is a sponsors column 520, which identifies sponsors of the corresponding player. The fourth column is a player measure data column 525, which identifies a player measurement data file associated with the corresponding player. A player measurement data file includes player measurements such as hand measurements and feet measurements.

Figure 6:
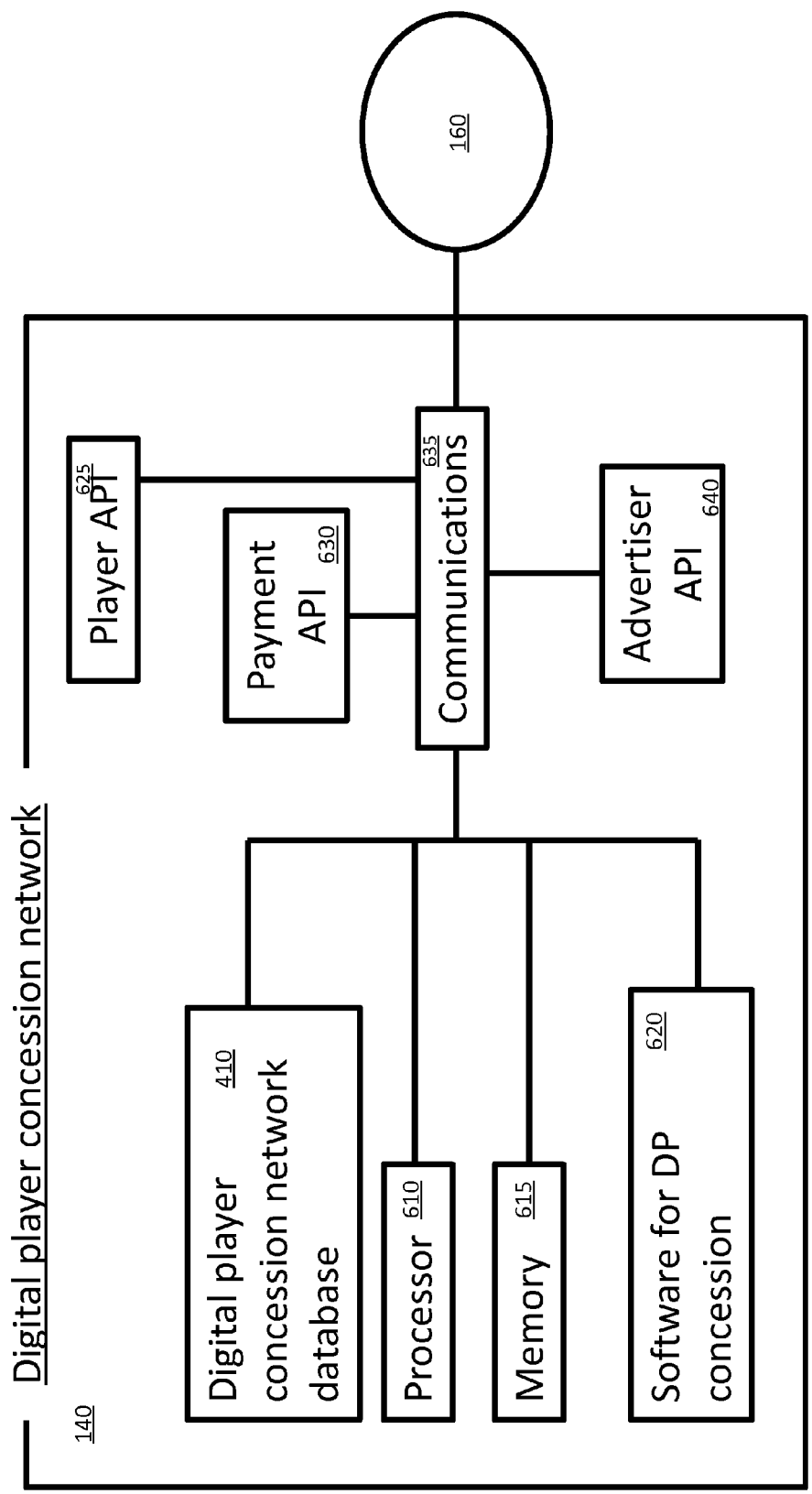
FIG. 6 illustrates a digital player concession network.

FIG. 6 illustrates the digital player concession network 140. The digital player concession network 140 of FIG. 6 includes the digital player concession network database 410, a processor 610, a memory 615, a software for digital player concession 620, a player application program interface (API) 625, a payment API 630, a communications interface 635, and an advertiser API 640. When an advertiser such as Advertiser 1 145 or Advertiser 2 147 sponsors a player, the advertiser API 640 allows the sponsoring advertiser to update the digital player concession network database 410 to reflect the sponsorship. The payment API 630 allows the digital player concession network 140 to interact with organizations such as credit card companies to process a payment. The player API 625 allows for the input of data such as player information and player measurements. Data such as player information and player measurements is stored in the digital player concession network database 410. The communications interface 635 communicates via the communications network 160. The processor 610 can be used to run the digital player concession network 140. The memory 615 can store, in part, instructions and data for execution by the processor 610. The software for digital player concession 620 can create a photo of a user superimposed with a selected player.

Figure 7:
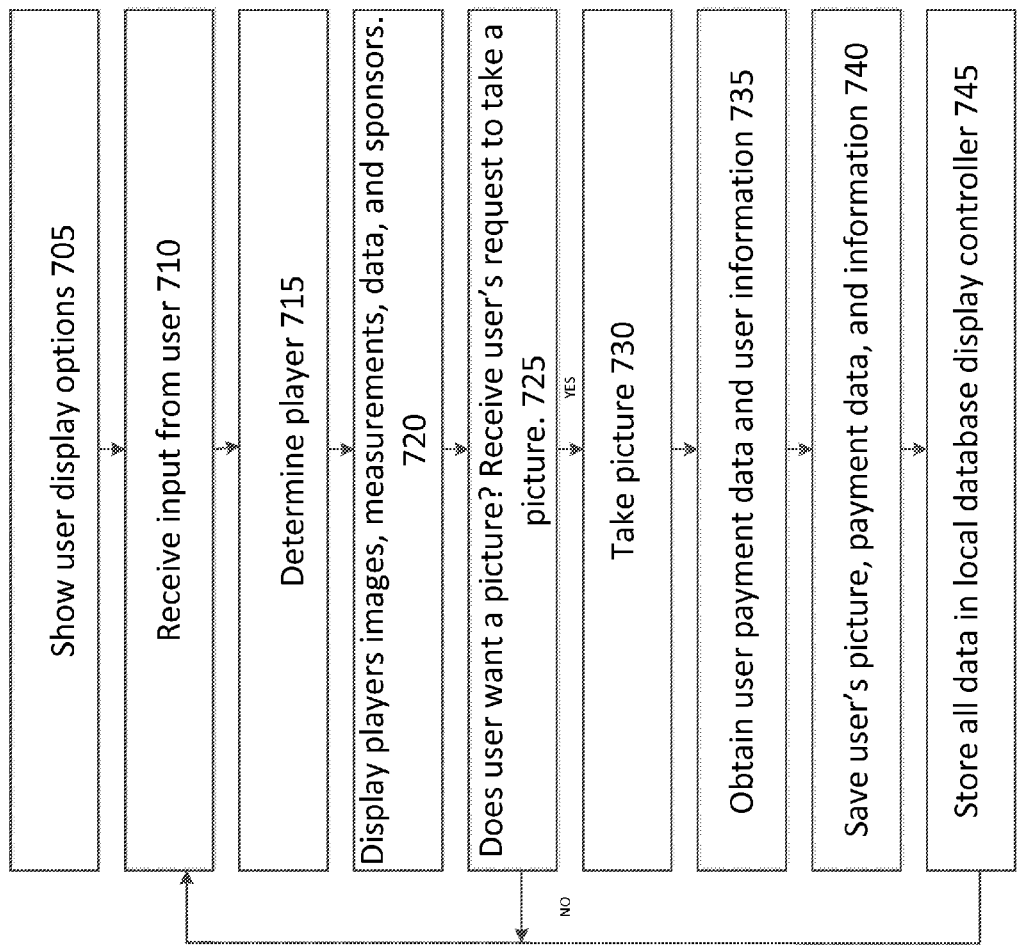
FIG. 7 illustrates a method for controlling a fan kiosk.

FIG. 7 illustrates a method 700 for controlling the fan kiosk 105. At block 705 of FIG. 7, the display controller software 230 shows user display options. The display options can be shown on the station GUI 125. At block 710, the display controller software 230 receives input from a user. The input can be player selection input received from the station GUI 125. At block 715, display controller software 230 determines which player was selected by the user. At block 720, the display controller software 230 displays various player images, measurements, and data, as well as one or more sponsors associated with the selected player. The display can be shown at the fan kiosk 105. At block 725, the method continues to block 730 when the display controller software 230 receives a user request to take a picture. The method otherwise returns to block 710. At block 730, the display controller software 230 takes a picture of the user. The display controller software 230 can take the picture using the camera 115. At block 735, the display controller software 230 obtains user payment data and user information. The display controller software 230 can obtain user payment data through the payment GUI. The display controller software 230 can obtain user information through the station GUI 125. At block 740, the display controller software 230 saves the user's picture, payment data, and information. At block 745, the display controller software 230 stores all data in the local database display controller 235 and returns to block 710.

Figure 8B:
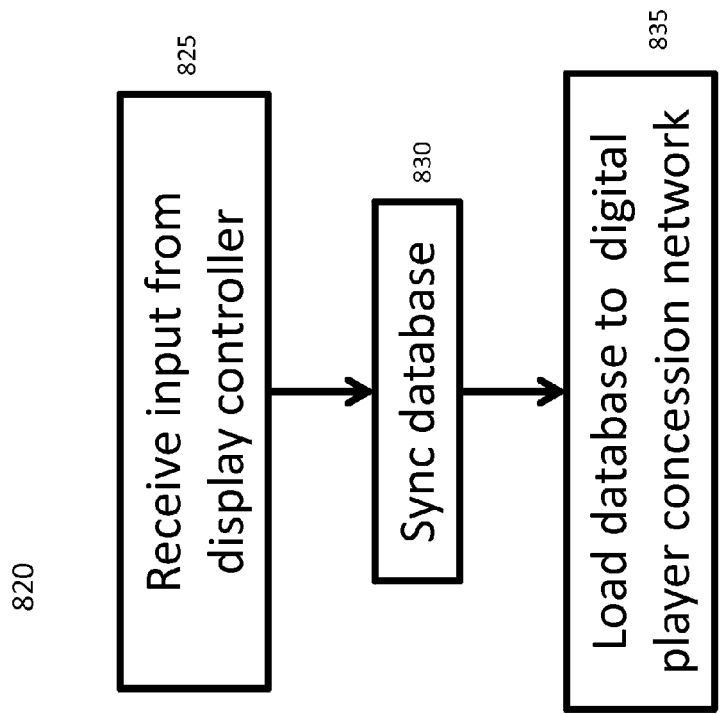
FIG. 8B illustrates a method for synchronizing data received from a display controller.
Figure 8A:
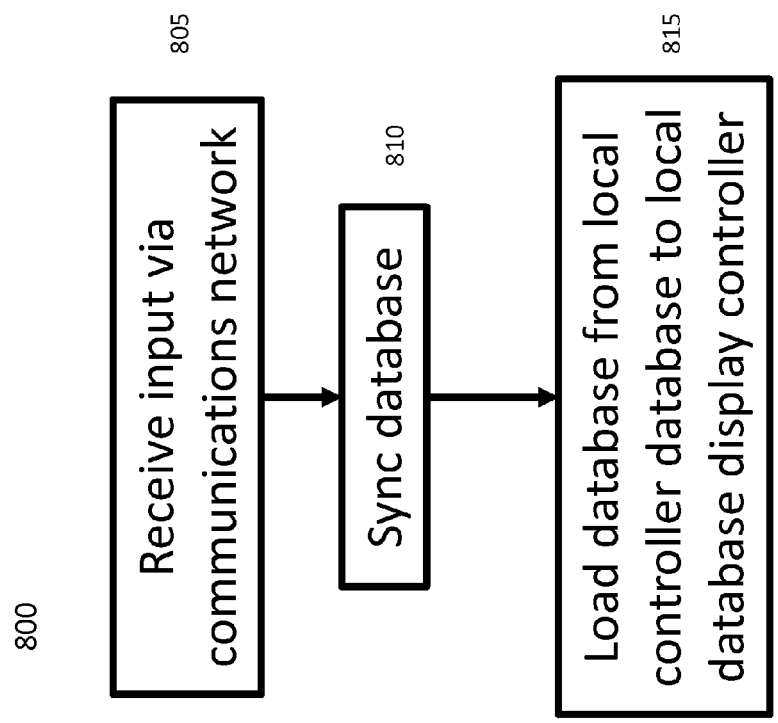
FIG. 8A illustrates a method for synchronizing data received from a communication network.

FIG. 8A illustrates a method 800 for synchronizing data received from the communication network 160. At block 805 of FIG. 8A, the local controller software 310 receives input via the communication network 160. The input can be data from the digital player concession network 140. At block 810, the local controller software 310 synchronizes a database. The local controller software 310 can synchronize the local controller database 330 with the digital player concession network database 410. At block 815, the controller database 330 is loaded to the local database display controller 235.

FIG. 8B illustrates a method 820 for synchronizing data received from the display controller 130. At block 825 of FIG. 8B, the local controller software 310 receives input from the display controller 130. The input can be from the local database display controller 235. At block 830, the local controller software 310 synchronizes a database. The local controller software 310 can synchronize the local controller database 330 with the local database display controller 235. At block 835, the controller database 330 is loaded to the digital player concession network 140 via the communication network 160. The controller database 330 can be loaded to the digital player concession network database 410.

Figure 9:
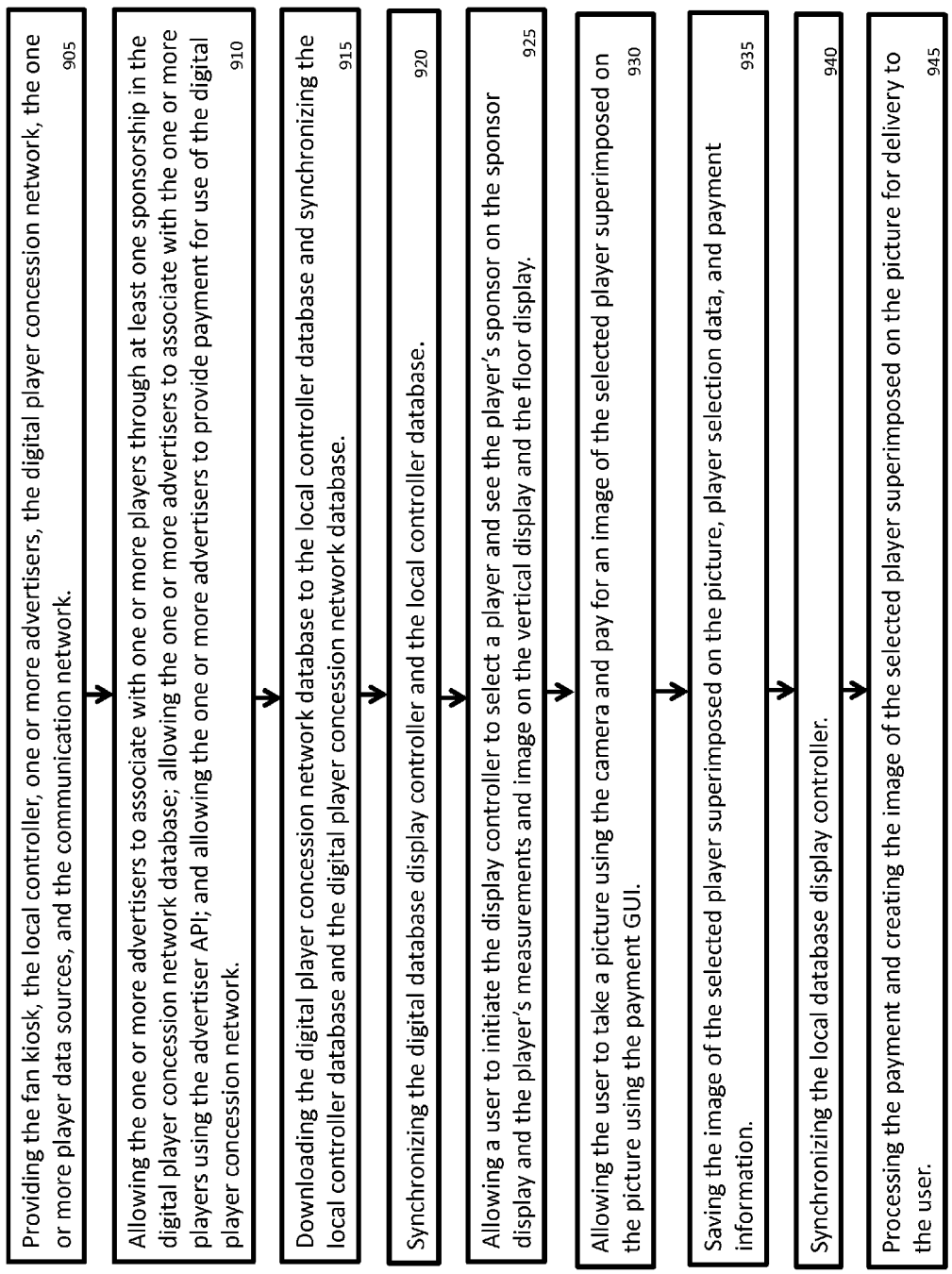
FIG. 9 illustrates a method for operating a fan kiosk.

FIG. 9 illustrates a method 900 for operating the fan kiosk 105. The method 900 includes, at block 905, providing the fan kiosk 105, the local controller 155, one or more advertisers, the digital player concession network 140, the one or more player data sources 150, and the communication network 160. The method 900 includes, at block 910, allowing the one or more advertisers to associate with one or more players through at least one sponsorship in the digital player concession network database 410; allowing the one or more advertisers to associate with the one or more players using the advertiser API 640; and allowing the one or more advertisers to provide payment for use of the digital player concession network 140. The method 900 includes, at block 915, downloading the digital player concession network database 410 to the local controller database 330 and synchronizing the local controller database 330 and the digital player concession network database 410. The method 900 includes, at block 920, synchronizing the digital database display controller and the local controller database 330. The method includes, at block 925, allowing a user to initiate the display controller 130 to select a player and see the player's sponsor on the sponsor display 110 and the player's measurements and image on the vertical display 120 and the floor display 135. The method includes, at block 930, allowing the user to take a picture using the camera 115 and pay for an image of the selected player superimposed on the picture using the payment GUI. The method includes, at block 935, saving the image of the selected player superimposed on the picture, player selection data, and payment information. The method 900 includes, at block 940, synchronizing the local database display controller 235. The local database display controller 235 and the local control database 330 can be synchronized. The local database display controller 235, local control database 330, and digital player concession network database 410 can also by synchronized. The method 900 includes, at block 945, processing the payment and creating the image of the selected player superimposed on the picture for delivery to the user.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.). Names used for people and organizations are also exemplary.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for operating a kiosk, the method comprising:
   receiving sponsorship information sent over a communication network from a controller, the sponsorship information identifying a set of one or more sponsors of a plurality of players, each player associated with a different set of one or more sponsors;
   displaying the plurality of players and a photo option for selection on a graphical user interface;
   receiving a player selection from a user through the graphical user interface;
   displaying one or more life-size representations of the selected player on a floor display and a vertical display, wherein the vertical display is upright in relation to the floor display;
   displaying a sponsor image on a sponsor display, the sponsor image associated with one of the one or more sponsors, wherein the associated sponsor is selected from the set of sponsors associated with the selected player;
   capturing an image of the user and requesting payment from the user when the user selects the photo option; and
   providing a photo to the user, wherein the photo includes the user and the selected player.

2. The method of claim 1, wherein information associated with the user is stored in a database.

3. The method of claim 1, wherein the statistics associated with the selected player are displayed on the floor display and on the vertical display.

4. A system for operating a kiosk, the system comprising:
   a floor display;
   a vertical display; and
   a processor that executes instructions stored in memory, wherein execution of the instructions by the processor:
      receives sponsorship information sent over a communication network from a controller, the sponsorship information identifying a set of one or more sponsors of a plurality of players, each player associated with a different set of one or more sponsors,
      displays the plurality of players and a photo option for selection on a graphical user interface,
      receives a player selection from a user through the graphical user interface,
      displays one or more life-size representations of the selected player on a floor display and a vertical display, wherein the vertical display is upright in relation to the floor display,
      displays a sponsor image on a sponsor display, the sponsor image associated with one of the one or more sponsors, wherein the associated sponsor is selected from the set of sponsors associated with the selected player,
      captures an image of the user and requests payment from the user when the user selects the photo option, and
      provides a photo to the user, wherein the photo includes the user and the selected player.

5. The system of claim 4, wherein information associated with the user is stored in a database.

6. The system of claim 4, wherein the statistics associated with the selected player are displayed on the floor display and on the vertical display.

7. A non-transitory computer-readable storage medium having embodied thereon a program executable by a processor to perform a method for operating a kiosk, the method comprising:
   receiving sponsorship information sent over a communication network from a controller, the sponsorship information identifying a set of one or more sponsors of a plurality of players, each player associated with a different set of one or more sponsors;
   displaying the plurality of players and a photo option for selection on a graphical user interface;
   receiving a player selection from a user through the graphical user interface;
   displaying one or more life-size representations of the selected player on a floor display and a vertical display, wherein the vertical display is upright in relation to the floor display;
   displaying a sponsor image on a sponsor display, the sponsor image associated with one of the one or more sponsors, wherein the associated sponsor is selected from the set of sponsors associated with the selected player;
   capturing an image of the user and requesting payment from the user when the user selects the photo option;
   providing a photo to the user, wherein the photo includes the user and the selected player.

8. The non-transitory computer-readable storage medium of claim 7, wherein the statistics associated with the selected player are displayed on the floor display and on the vertical display.

* * * * *